Aug. 2, 1932.         M. A. ROBIN         1,870,142
PUNCTURE PROOF CUSHION WHEEL
Filed Aug. 4, 1927     2 Sheets-Sheet 1
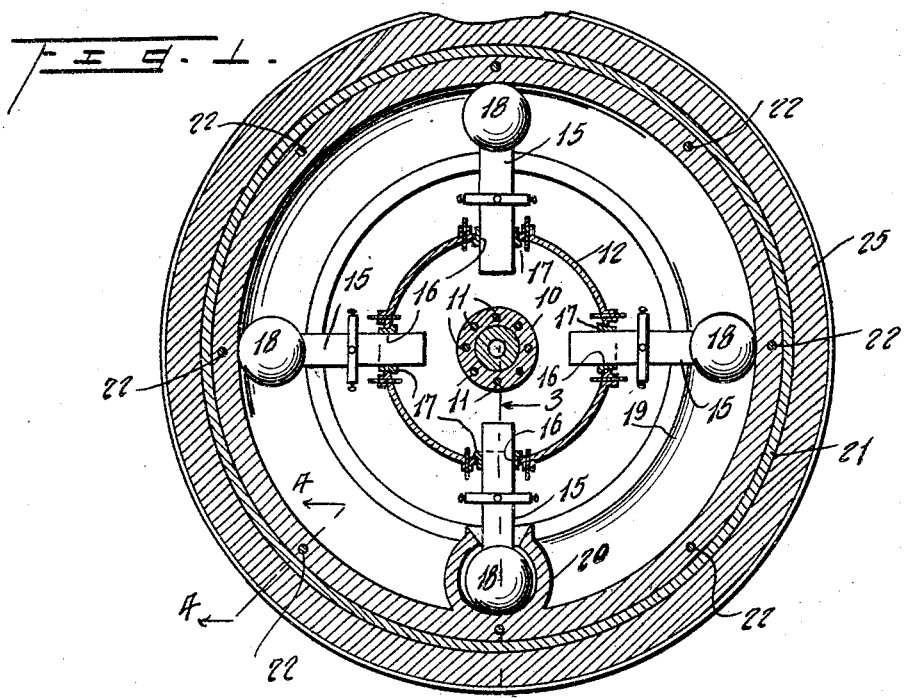
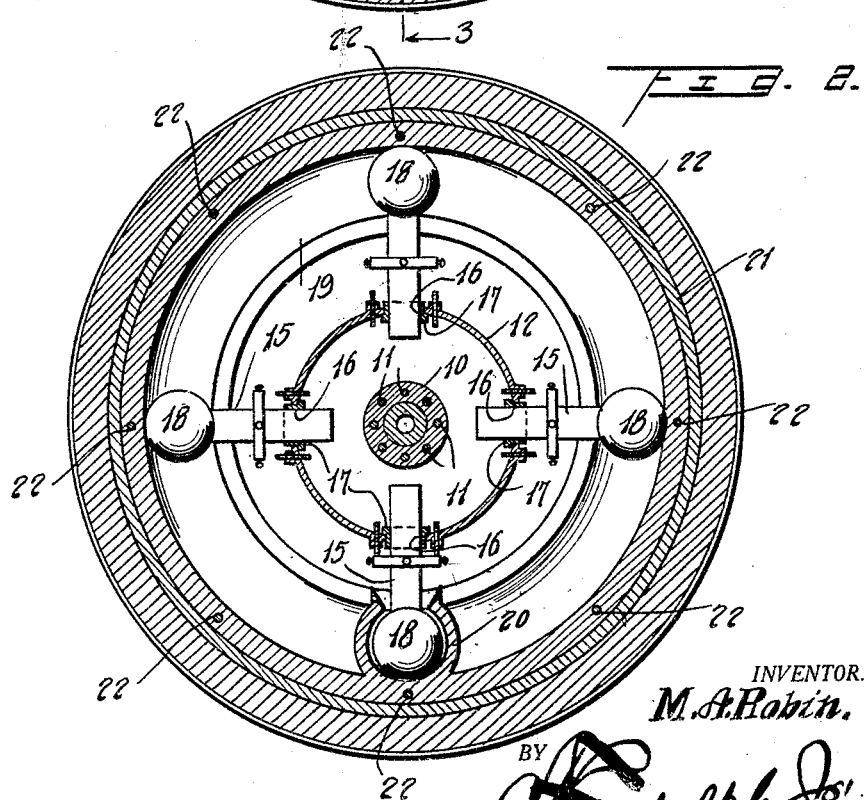
INVENTOR.
M. A. Robin.
BY
ATTORNEY.

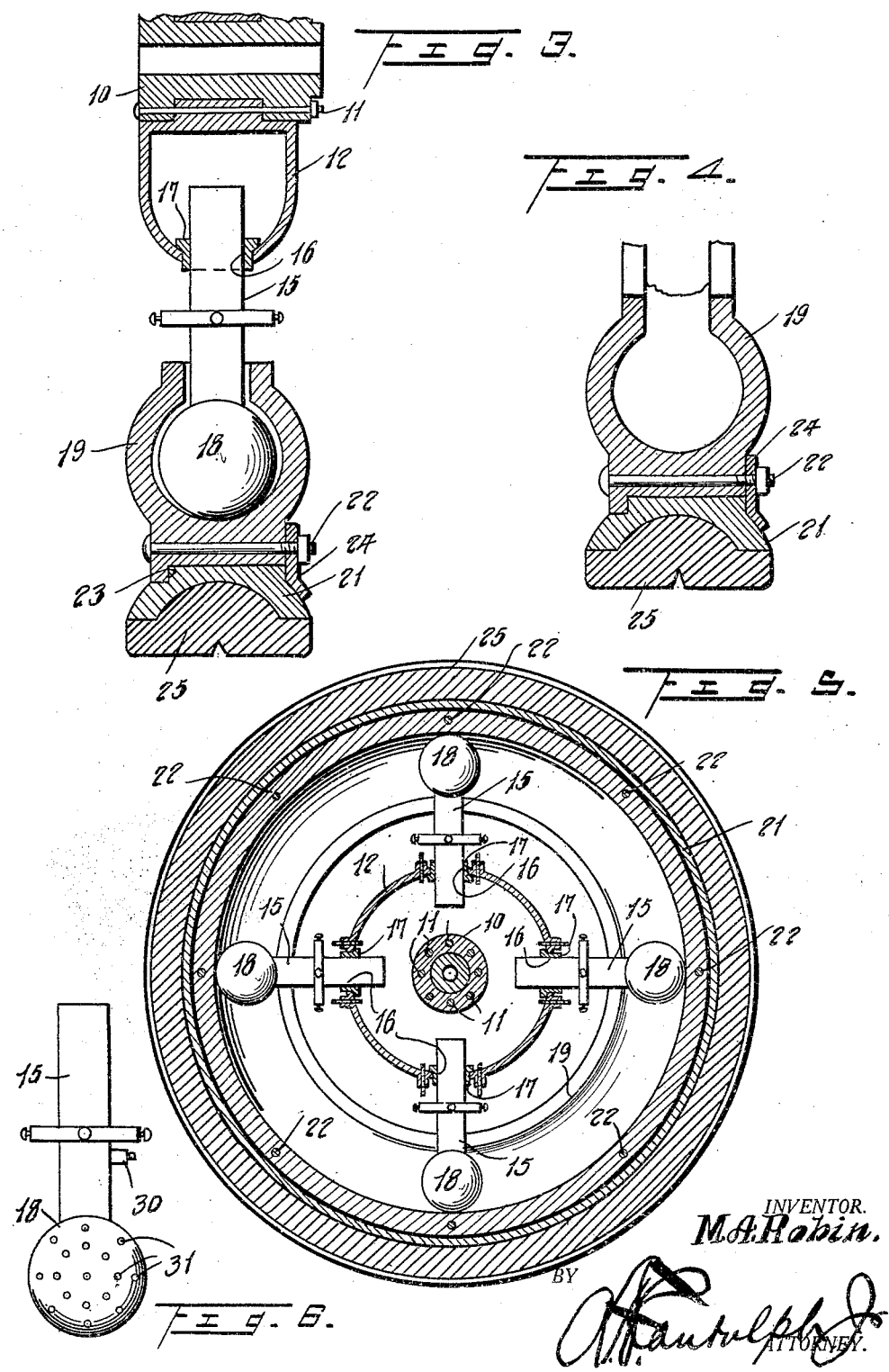

Patented Aug. 2, 1932

1,870,142

UNITED STATES PATENT OFFICE

MARCEL A. ROBIN, OF PORT-AU-PRINCE, HAITI

PUNCTURE PROOF CUSHION WHEEL

Application filed August 4, 1927. Serial No. 210,623.

This invention relates to a wheel designed for use on vehicles generally, which will be free of danger from puncture and which constitutes an improvement of the structure disclosed in my application Serial No. 109,333 and allowed December 30, 1926 and maturing into Patent 1,637,280, July 26, 1927.

The present structure particularly aims to provide a form wherein the spokes or the equivalent will not interfere with the proper movement of the felly and tire, relatively to the remainder of the wheel.

The more specific objects and advantages will become apparent from a consideration of the description following taken in connection with accompanying drawings illustrating an operative embodiment.

In said drawings:

Figure 1 is a view in central vertical section illustrating the improved wheel;

Figure 2 is a view similar to Figure 1 but showing the axle lowered as under the weight of a load;

Figure 3 is a detail sectional view taken on the line 3—3 of Figure 1;

Figure 4 is a detail sectional view taken on the line 4—4 of Figure 1;

Figure 5 is a view similar to Figure 1 but taken through a modified form, and

Figure 6 is a detail elevation of one of the spokes of a modified form.

Referring specifically to the drawings, the wheel is equipped with a suitable hub 10 for connection to an axle, the particular type of hub being immaterial.

Fastened to the hub in any suitable manner as by bolts 11 is an endless reservoir 12 adapted to contain air at any appropriate pressure. This reservoir may be of any desired cross sectional area and size. Preferably it is made from a suitable stout metal so that it will be practically free from danger of puncture.

Radiating from the reservoir are a suitable number of spokes or pistons 15, preferably of metal, either solid or hollow as preferred. Such pistons 15 slide radially of the reservoir in openings 16 of the latter but are disposed in hermetic engagement at said openings for instance through the provision of gaskets as at 17.

At the outer ends, the pistons 15 terminate in balls or spheres 18, adapted for coaction with a felly 19. Such felly contains a socket as at 20 in which one of the balls 18 is loosely disposed. The inner portion of the felly aside from the socket 20, is of U-shape in cross section, and loosely accommodates the remaining balls 18. As a result of this construction, all movement of the felly is substantially from the ball 18 within the socket 20 as a fulcrum or axis, the remaining balls being unrestricted so as not to have any means interfering with free motion of the felly relative to the reservoir or balance of the wheel.

In this form of the invention, while a tire may be used as in my aforesaid allowed application, yet I prefer to provide a rim as at 21, which is demountably secured in place by bolts 22 passing through the felly 19 in cooperation with a rib 23 on said felly and a detachable side plate 24 through which the bolt passes. Any suitable form of tire, solid or pneumatic as at 25 may be carried by the rim 21.

In Figure 5 a modified form is shown. In such figure, the structure is exactly like that of the preceding form with the omission of the socket 20, the inner portion of the felly being U-shaped in cross section completely around the same so as to be generally in conformity with the cross sectional shape through the balls and spokes. With this form, no undue interference is afforded by the spoke incidental to the operation of the wheel.

A modified form is shown in Figure 6 wherein the spoke is hollow and adapted to contain oil, grease or other lubricant which may be supplied by pressure through a conventional coupling 30. The grease or other lubricant is adapted to ooze through apertures or ports 31, of any desired number, provided in the heads or balls 18, and adapted to engage and lubricate the walls of the felly engaged by such balls.

The felly as uesd in the form of Figures 1 to 4, may be used on any wheel, whether motive or non-motive. The felly, however, in the case of the form of Figure 5 can only be used on a non-motive wheel.

Since a detachable felly flange is used at 24, the device may be made to accommodate the usual rim, particularly where one is used as a spare.

Various changes may be resorted to provided they fall within the spirit and scope of the invention.

I claim as my invention:—

1. A wheel of the character specified having an air reservoir, spokes coacting with the air in said reservoir for cushioning, balls on said spokes, a felly engaged by the balls and capable of substantially unrestricted yielding movement from one of the balls as an axis.

2. A wheel of the character specified having an air reservoir, spokes coacting with the air in said reservoir for cushioning, balls on said spokes, a felly engaged by the balls and capable of substantially unrestricted yielding movement from one of the balls as an axis, the inner surface of the felly being hollow and having a restricted outlet to accommodate the balls and the spokes.

3. A wheel of the character specified having an air reservoir, spokes coacting with the air in said reservoir for cushioning, balls on said spokes, a felly engaged by the balls and capable of substantially unrestricted yielding movement from one of the balls as an axis, the inner surface of the felly being hollow and having a restricted outlet to accommodate the balls and the spokes, and a socket for one of the balls provided on the felly, the other balls being substantially unrestricted.

In testimony whereof I affix my signature.

MARCEL A. ROBIN.